United States Patent [19]

Eguchi et al.

[11] Patent Number: 5,032,713
[45] Date of Patent: Jul. 16, 1991

[54] PHOTOSENSING DEVICE AND PHOTOSENSING APPARATUS USING A PROBE ELECTRODE

[75] Inventors: Ken Eguchi, Yokohama; Toshihiko Miyazaki, Hiratsuka; Kunihiro Sakai, Isehara, all of Japan

[73] Assignee: Canon Kabushiki Kaisha, Tokyo, Japan

[21] Appl. No.: 464,381

[22] Filed: Jan. 12, 1990

[30] Foreign Application Priority Data

Jan. 20, 1989 [JP] Japan .................................. 1-9921
Nov. 27, 1989 [JP] Japan ................................ 1-304879

[51] Int. Cl.⁵ ............................................ H01J 40/14
[52] U.S. Cl. ............................... 250/211 R; 250/338.1
[58] Field of Search ........... 250/211 R, 338.1, 370.01, 250/370.04; 357/15

[56] References Cited

U.S. PATENT DOCUMENTS

| | | | |
|---|---|---|---|
| 3,731,095 | 5/1973 | Komoda | 250/211 R |
| 4,343,993 | 8/1982 | Binnig et a. | 250/306 |
| 4,763,002 | 8/1988 | Zermeno et al. | 250/370.01 |
| 4,786,810 | 11/1988 | Shulman et al. | 250/370.01 |
| 4,794,438 | 12/1988 | Levinson et al. | 250/211 R |
| 4,829,173 | 5/1989 | Ditchek et al. | 250/211 R |
| 4,835,587 | 5/1989 | Sato et al. | 250/370.01 |

FOREIGN PATENT DOCUMENTS

0027517A1 4/1981 European Pat. Off. .
0296262A1 12/1988 European Pat. Off. .
3242712 5/1984 Fed. Rep. of Germany .

OTHER PUBLICATIONS

Patent Abstracts of Japan, vol. 11, No. 260 (P-608) (2707), Aug. 22, 1987, JP 62-63823, Mar. 20, 1987.
Japanese Journal of Applied Physics/Part 2: Letters, vol. 27, No. 5, May 1988, pp. L866-L888, Tokyo, JP; Y. Yasuoka et al.
Journal of Vacuum Science & Technology: Part A, vol. 6, No. 2, Mar./Apr. 1988, pp. 466-469, New York, U.S.; L. Arnold et al.

Primary Examiner—David C. Nelms
Assistant Examiner—S. Allen
Attorney, Agent, or Firm—Fitzpatrick, Cella, Harper & Scinto

[57] ABSTRACT

A photosensing device comprising at least one probe electrode, a light-absorbing medium in opposition to the probe electrode, and a means for adjusting the distance between the probe electrode and the light-absorbing medium.

16 Claims, 5 Drawing Sheets

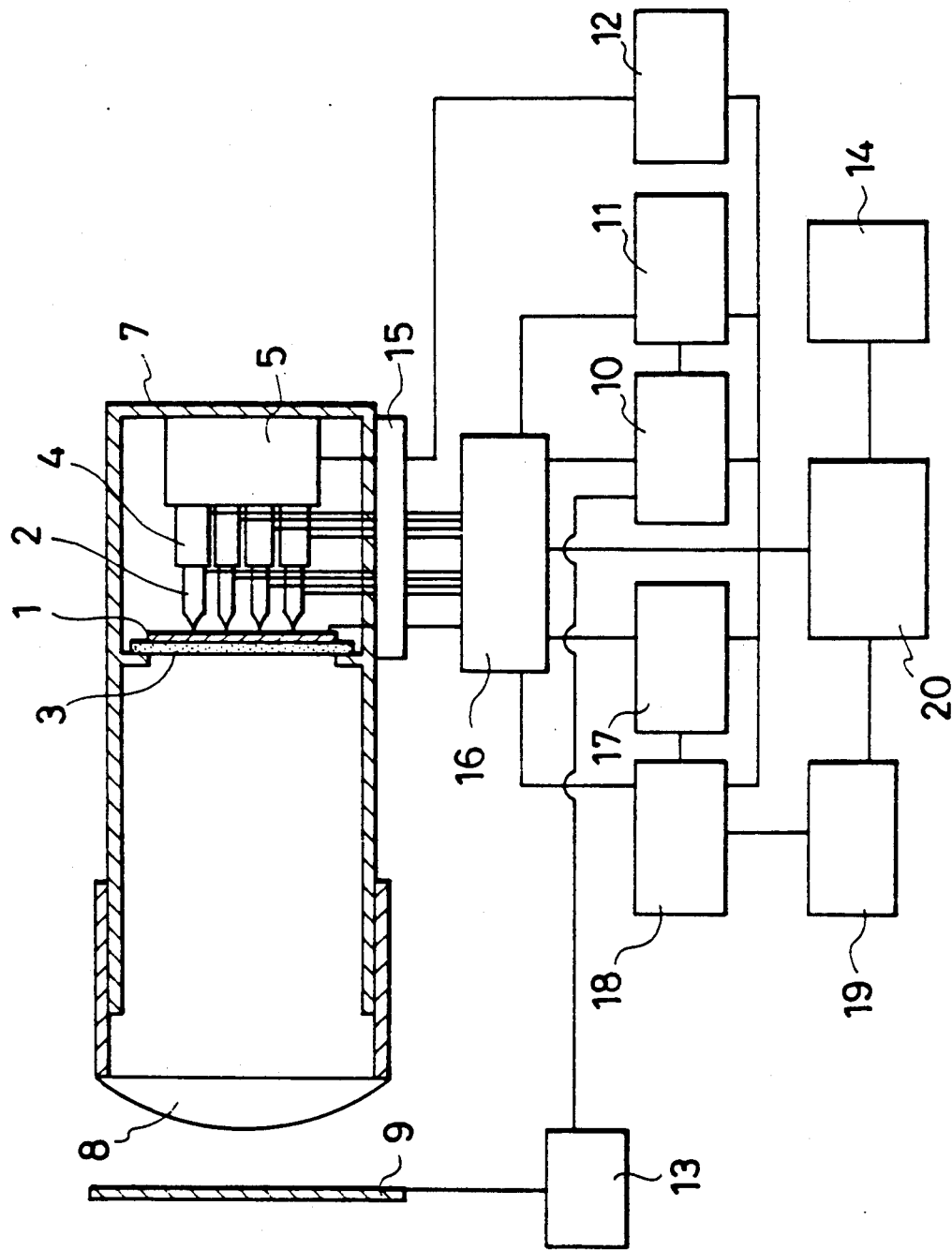

PHOTOSENSING DEVICE AND PHOTOSENSING APPARATUS USING A PROBE ELECTRODE

BACKGROUND OF THE INVENTION

1. Field of the Invention

The present invention relates to a photosensing device and a photosensing apparatus, more particularly to a photosensing device and a photosensing apparatus applicable to photon counting, light intensity distribution measurement, or applicable to a color-image pickup element.

2. Related Background Art

In a metal-insulator-metal (MIM) junction, electrons penetrate through the energy barrier in an extremely short time on an order of $10^{-16}$ second. Thus, by use of this type of junction, ultrahigh speed detection of electro-magnetic waves can be achieved over a wide range of frequency from a micro-wave to a visible light. Conventional metal-metal point-contact diodes used for a wave detection and a frequency mixing at far infrared and infrared wavelength regions are, however, weak for a mechanical or electrical shock, resulting in a shorter life because of the point-contact type thereof. (See Koichi IJICHI, and Sogo OKAMURA: Denshi Tsushin Gakkai (Electronic Communication Society), Microwave Research Data: MW-73-27 (1973-06)).

For this reason, a mechanically strong MIM junction is demanded for a practical wave detector. In view of the RC time constant, the resistance for a tunnel current is so very small, that the detected signal cannot be taken out effectively, because the impedance is too low, even in the MIM junction having the minimum area producible by vapor deposition.

On the other hand, a method is considered which utilizes an ultra-thin metal film having an island-like structure prepared by vapor deposition for the purpose of realizing a junction having a minute area. (See T.E. Hartman: J. Appl. Phys., 34, 943 (1963)).

This ultra-thin film has a structure in which numberless MIM junctions are connected mutually in parallel and in series over all the surface. This ultra-thin film is utilized as an ultrahigh speed detector, in which the signals detected by the individual MIM junctions are integrated on the whole surface, and taken out when an infrared light is irradiated on it. However, it is not easy to produce such an ultra-thin metal film having the island-like structure stably and well in repeatability, so that it is difficult to produce elements having constant wave-detection characteristics. Moreover, the ultra-thin film is weak for electric shock and has short life, not necessarily giving a practical element.

SUMMARY OF THE INVENTION

The present invention intends to provide a photosensing device and a photosensing apparatus having a point-contact structure, which have solved the problems mentioned above, and are resistant to an electric shock, stable and excellent in repeatability.

The above object can be achieved by the present invention mentioned below.

According to an aspect of the present invention, there is provided a photosensing device comprising at least one probe electrode, a light-absorbing medium in opposition to the probe electrode, and a means for adjusting the distance between the probe electrode and the light-absorbing medium.

According to another aspect of the present invention, there is provided a photosensing apparatus comprising at least one probe electrode, a light-absorbing medium in opposition to the probe electrode, a means for adjusting the distance between the probe electrode and the light absorbing medium, a means for applying voltage between the probe electrode and the light-absorbing medium, and a means for measuring a change of electric current flowing between the probe electrode and the light absorbing medium caused by light absorption.

BRIEF DESCRIPTION OF THE DRAWINGS

FIG. 6 illustrates a block constitution of a photosensing device of another embodiment of the present invention.

DETAILED DESCRIPTION OF THE PREFERRED EMBODIMENTS

The present invention is described in detail by referring to the figures.

Figure 1:
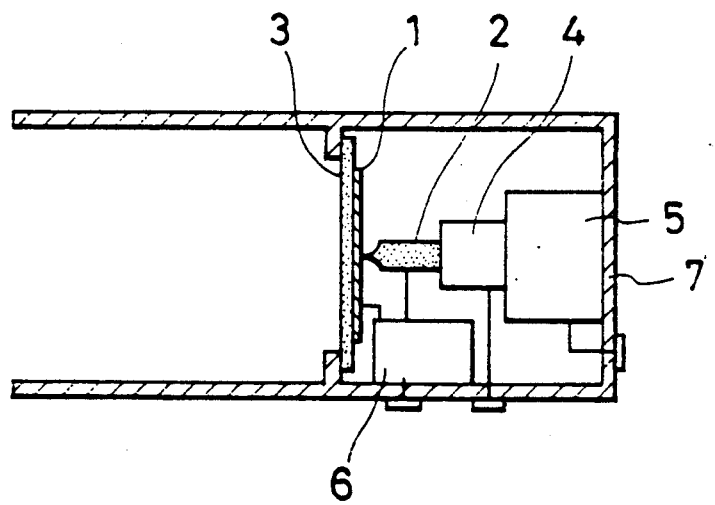
FIG. 1 illustrates a block constitution of a photosensing device of the present invention.

FIG. 1 illustrates a block constitution of a photosensing device of the present invention. The probe electrode 2 and the light-absorbing electrode 1 provided on the transparent substrate 3 in opposition to the probe electrode are placed in the light and electromagnetic shield box 7.

The current-preamplifier 6 amplifies the probe current flowing on application of a constant voltage between the probe electrode 2 and the light-absorbing electrode 1. Thereby the fine control mechanism 4 employing a piezo element controls the distance between the light-absorbing electrode 1 and the probe electrode 2 so as to keep the probe current constant. The coarse control mechanism 5 is provided to bring the probe electrode beforehand to a position within a controllable range of the fine control mechanism.

In the present invention, as the probe electrode 2, a wire (1 mm in diameter) made of a noble metal such as Pt were used, a tip of which is mechanically rounded into a cone shape of 90° and the surface atoms of which are evaporated off by application of an electric field in ultrahigh vacuum. However, any electroconductive material having an electric conductivity of not less than $10^{-6}$S/cm, such as a probe of electrically polished tungsten, may be used as the probe electrode. Thus, the probe electrode is not limited in shape, material and the treatment method thereof in any way.

The light-absorbing electrode 1, on the other hand, may also utilize directly light-absorbing characteristics of a material having a high electric conductivity. For that purpose, the employed electrode material is exemplified by metals such as Au, Pt, Rh, Ag, Pd, Al, In, Sn, W, etc., or alloys thereof; graphite; electric conductive oxides such as silicides, ITO, etc; electric conductive organic materials; and many other materials. These materials may be used in the present invention. The electrode employing such a material may be prepared by any known thin-film-forming method. The substrate 3 supporting the electrode may be made of any material of glass, ceramics, and plastics, etc. In the case where the light is introduced from a direction opposite to the probe electrode as shown in FIG. 1, the material have to be semi-transparent or transparent. The substrate may be in any shape, preferably be a planar shape, but the shape is not limited thereto.

Figure 2:
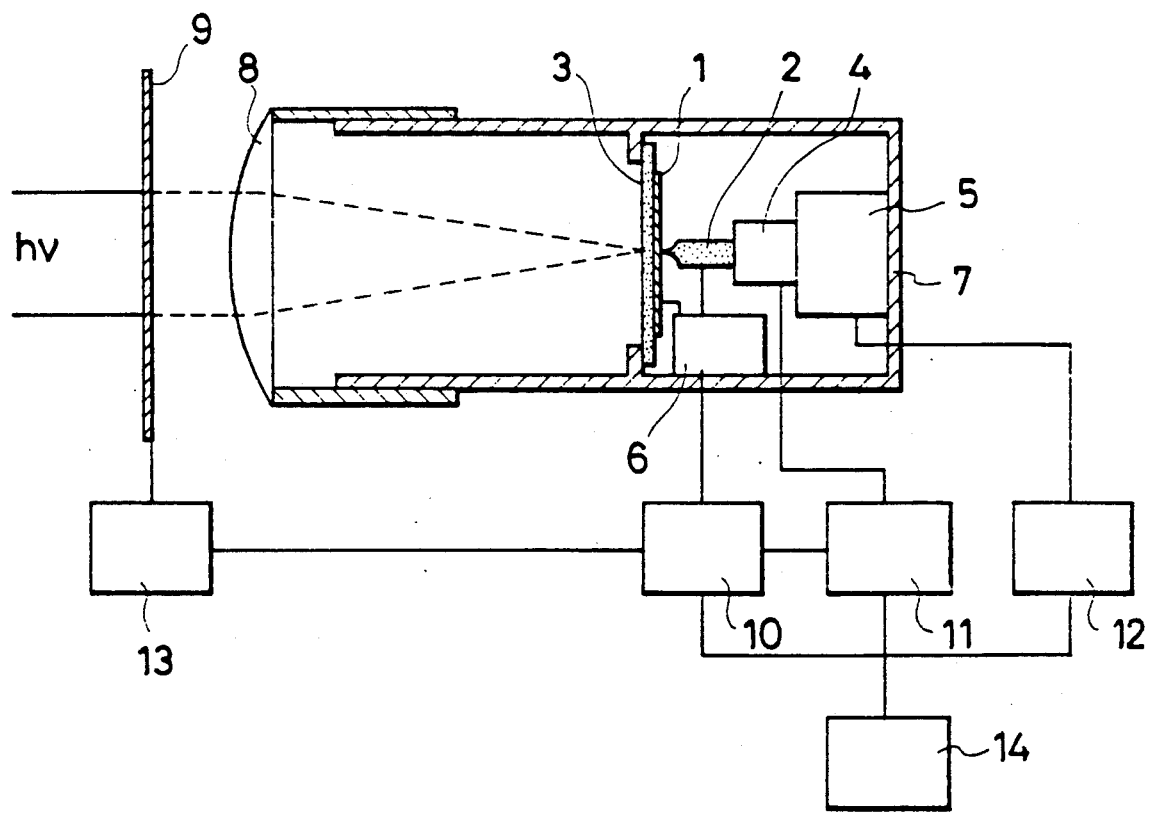
FIG. 2 illustrates a block constitution of a photosensing apparatus having a photosensing device.

For providing a photosensing device sensitive to a specific wavelength of light, organic dyes are preferably used as the light-absorbing medium. Although organic dyes per se are generally insulative and are not applicable as electrode materials, they can be used in the present invention if deposited thin on an electric conductive medium. The electric conductive medium may be made from a material having a high electric conductivity mentioned above. However, a light transmission type of optical system as shown in FIG. 2 requires a transparent or semitransparent electrode material and the preparation method therefor. An electrode employing such a material can be formed satisfactorily according to a known film-forming technique, where the electrode material is preferably made of an electric conductive oxide such as a noble metal and ITO, which material does not form an insulating oxide film on the surface upon forming an organic dye film.

Such dye may satisfactorily be deposited according to a known thin-film-forming technique. For this purpose, particularly suitable is an LB method capable of controlling film thickness on an order of a molecular length. The ligh-absorption layer of the present invention preferably has a thickness in the range of from several nm to 50 nm, more preferably from 1 nm to 20 nm.

FIG. 2 illustrates a block constitution of a photosensing apparatus provided with the photosensing device shown in FIG. 1.

The servo circuit 11 controls the fine control mechanism 4. The coarse driving circuit 12 drives the coarse control mechanism 5.

In principle, the quantity of incident light can be detected by monitoring a probe current or an output voltage of the servo circuit on light irradiation. In FIG. 2, the incident light is irradiated intermittently through the chopper 9, and the probe current is amplified synchronously with it by means of the synchronous amplification circuit 10. This synchronous amplification circuit 10 amplifies a difference between a light current and the dark current, and simultaneously detects the synchronous signal of light irradiation and actuates a HOLD circuit, thereby delivering only the dark current signal to the servo circuit as the servo signal. Thus, the fine control mechanism is controlled by keeping constant the dark current so as to keep constant the distance between the probe electrode 2 and the light absorbing electrode 1. In the actuation process, the probe current output, the servo circuit output, and the coarse control output are monitored with the display device 14. The chopper driving circuit 13 is a circuit for driving the chopper 9.

The lens 8 serves to condense the incident light onto the light absorbing electrode. The lens is provided for raising the sensitivity, but is not essentially required. The arrangement of the optical system is not limited to those disclosed by the present invention, but various arrangements are applicable. For example, the light may be irradiated from the side of the probe electrode. The chopper 9 is also not essentially required for the photosensing device.

According to the present invention, the measurement values obtained are stable and excellent in reproducibility since the distance between the probe electrode and the light-absorbing medium is controlled, and the change of the tunnel current caused by light irradiation is measured. Further the present invention is highly characterized in that since the absorption wavelength region of the light absorbing medium is freely controllable, the light in an arbitrary wavelength region is detectable. Further the present invention allows the detection of the change of state of the light absorbing medium in the order of a molecular level similarly as a scanning tunnel microscope, thus a photosensing device and a photosensing apparatus suitable for photon counting with extremely high sensitivity can be provided.

Examples of the present invention specifically are described as follows.

EXAMPLE 2

Figure 3:
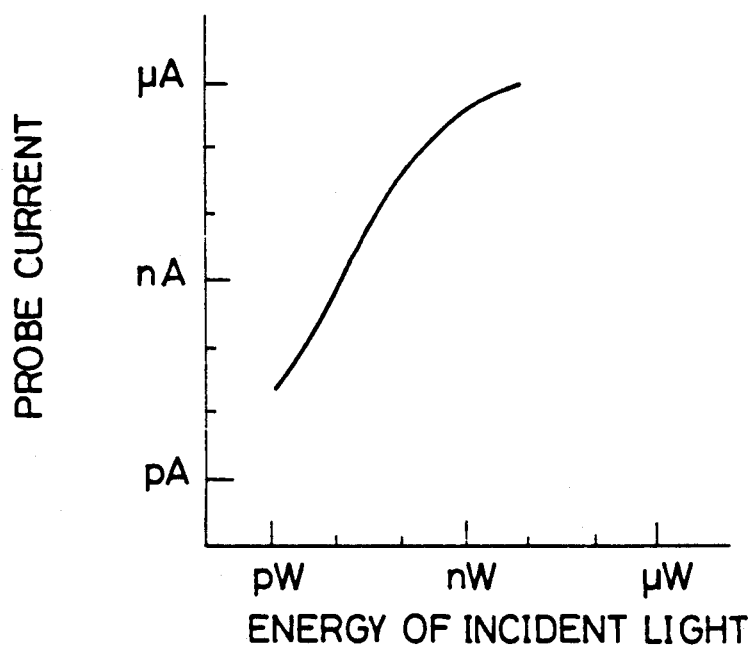
FIG. 3 shows a sensitivity curve of the photosensing device of Example 1.

On a fused quartz substrate plate having been washed carefully and sufficiently, an Au electrode having a film thickness of 30 nm was formed by vacuum deposition employing resistance-heating with a tungsten filament to prepare a photosensing device as shown in Table 1. By employing this element in a manner as shown in FIG. 2, a voltage of 100 mV was applied between the probe electrode and the light-absorbing electrode with the probe electrode being positive, and the fine control mechanism and the coarse control mechanism are controlled to maintain the dark current to be 10 pA. The relation between the probe current output and the incident light energy was observed by projecting a monochromatic light of 400 nm at 237 Hz to obtain the result shown in FIG. 3. The photosensing device with a high sensitivity showing a satisfactory S/N ratio at the incident light energy of several ten pW could be obtained. The incident light energy was calibrated with a Radio Meter, Model-360, made by United Detector Technology Co.

EXAMPLE 2

An LB film (8 layered) of squarilium-bis-6-octylazulene (hereinafter referred to as "SOAZ") was formed as a light-absorbing electrode on an Au electrode prepared in the same manner as in Example 1. Measure by projecting a monochromatic light of 750 nm at 237 Hz gave the result that a probe current signal with a sufficient S/N ratio could be obtained even with an energy of 10 pW.

EXAMPLE 3

Figure 4:
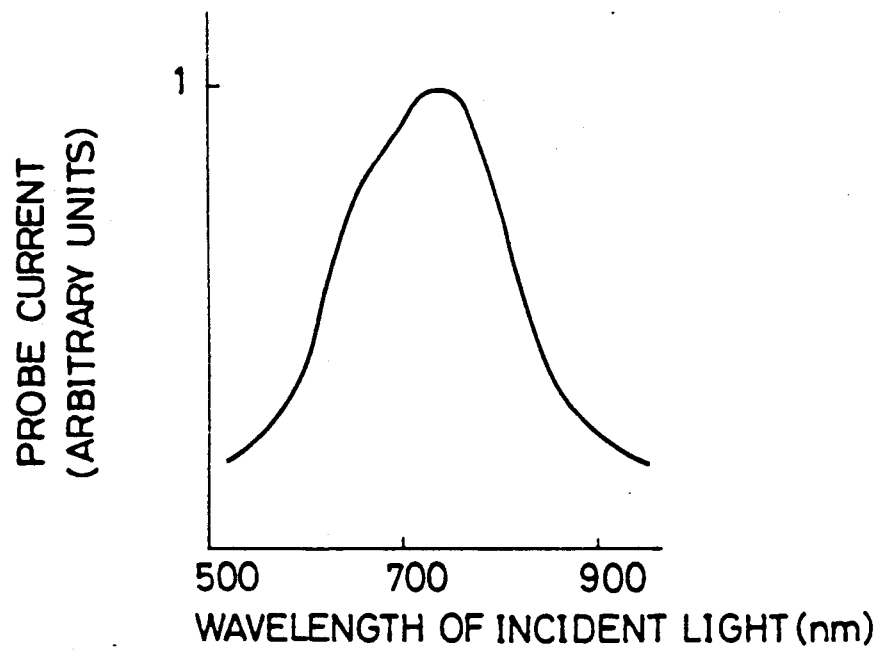
FIG. 4 and FIG. 5 shows respectively the action spectrum of the photosensing device in Example 3 and Example 4.

A light-absorbing electrode was prepared by laminating a SOAZ LB film in 8 layers on an ITO electrode. The action spectrum of the probe current was measured therewith. The energy of the incident light was approximately constant at about 100 pW. FIG. 4 shows the results. The action spectrum. approximately coincides with the absorption spectrum.

EXAMPLE 4

Figure 5:
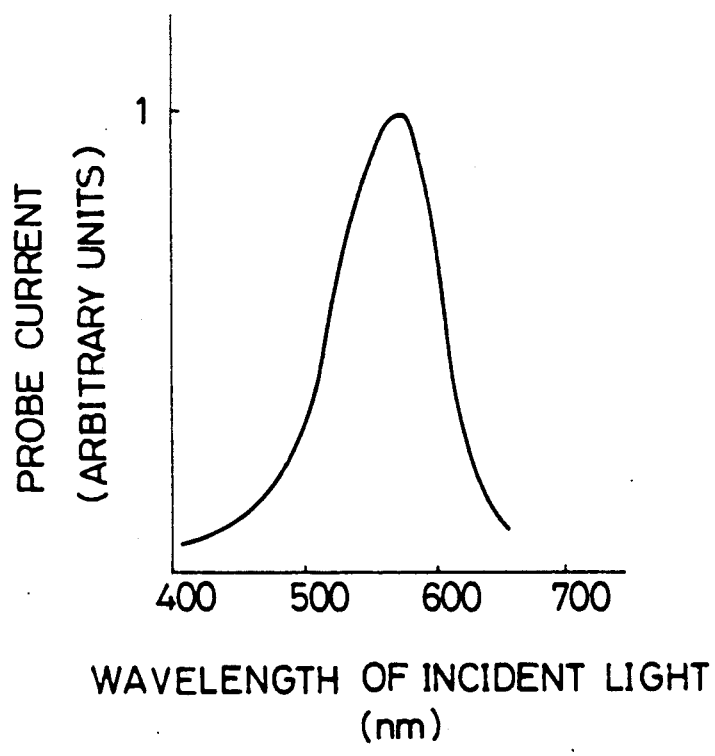

A photosensing device was prepared in the same manner as in Example 3 except that one layer of bacteriorhodopsin was laminated according to an LB method in place of SOAZ. The action spectrum was similar to that of visible sensitivity of the human eye and was of high sensitivity. FIG. 5 shows the action spectrum.

EXAMPLE 5

A light-absorbing electrode was prepared by depositing amorphous silicon in a thickness of 10 nm according to the glow discharge method. The sensitivity thereof toward a light of 600 nm was measured. It was found that a signal of sufficient S/N ratio was obtained with 10 pW.

Elements having a single probe were described in Examples 1-5. The present invention, however, is not limited to single-probe elements. The probe electrodes may be provided in a multiple manner to measure a light intensity distribution within a plane. Further, it may be used for a color-image pickup element in combination with a color filter.

Example 6 below describes a photosensing device having four probes.

EXAMPLES 6

FIG. 6 illustrates a block constitution of a photosensing device employing multiple probes. The photosensing device comprises four of the probe electrodes 2 and the light-absorbing electrode 1 in opposition to the probe electrodes. A probe current is amplified which is generated when a constant voltage is applied between the probe electrode 2 and the light-absorption electrode 1, and the fine control mechanism 4 having a piezo element for controlling the distance between the light-absorbing electrode 1 and the probe electrode 2 is controlled by a servo mechanism so that the probe current is kept constant. The principle is the same as in FIG. 2.

Firstly, one electrode is chosen as the standard. In the same manner as described in FIG. 2, the incident light intensity is detected at the position of the standard probe electrode, and simultaneously the distance between the light-absorbing electrode 1 and the probe electrode 2 is adjusted by control of the fine control mechanism with the servo circuit 11 so as to keep constant the probe current. Then, the differences of the probe current flowing at the standard probe electrode from the probe currents flowing at other probe electrodes are amplified by the probe current amplifying circuit 17, and each fine control mechanism 4 is controlled by the servo circuit 18 so that the probe currents may be zero. Thus the relative difference of incident-light intensities can be read at each probe position from the output of the servo circuit 18. The dark current correction circuit 19 corrects differences of dark current for the each probe current in the absence of incident light.

The probe currents are amplified and outputted in accordance with the command from the computor 20 through the coordinate-switching unit 16. The coordinate-switching unit 16 may be encased in a light and electromagnetic shield box.

The outputs from the probe electrode, the servo circuit 18, the coarse control mechanism, and the dark current correction circuit 19 are taken up by the computor 20, and are monitored by the display device in these operation process. The numeral 15 denotes a connection terminal.

In a similar manner as in FIG. 2, the lens 8 serves to condense the incident light onto the light-absorbing electrode, which serves to raise the sensitivity, but is not of essential necessity. The arrrangement of the optical system is also not limited to the systems disclosed in the Examples. The chopper 9 is not essentially necessary for the photosensing apparatus.

The probe materials and the light-absorbing electrode material described in Example of FIG. 2 may also be used in this Example.

According to the present invention, the measurement values obtained are stable and excellent in reproducibility since the distance between the probe electrode and the light-absorbing medium is controlled, and the change of the tunnel current caused by light irradiation is measured. Further the present invention is highly characterized in that since the absorption wavelength region of the light absorbing medium is freely controllable, the light in an arbitrary wavelength region is detectable. Further, the present invention allows the detection of the change of state of the light absorbing medium on the order of a molecular level similarly as a scanning tunnel microscope, thus a photosensing device and a photosensing apparatus suitable for photon counting with extremely high sensitivity can be provided.

Additionally, a device having plurality of probes enables measurement of light-intensity distribution within a plane, and color image pickup in combination with color filters and the like.

What is claimed is:

1. A photosensing device comprising at least one probe electrode, a light-absorbing medium in opposition to the probe electrode, and a means for adjusting the distance between the probe electrode and the light-absorbing medium.

2. The photosensing device of claim 1, wherein the light-absorbing medium comprises an organic dye and an electric conductor.

3. The photosensing device of claim 2, wherein the organic dye is formed of a monomolecular film or a monomolecular built-up film.

4. The photosensing device of claim 1, wherein the light-absorbing medium comprises an organic electric conductor and an organic semiconductor.

5. The photosensing device of claim 1, wherein the light-absorbing medium comprises an inorganic electric conductor and an inorganic semiconductor.

6. The photosensing device of claim 1, wherein the probe electrode is provided in plural numbers.

7. The photosensing device of claim 1, wherein a means for amplifying electric current detected by the probe electrode is provided.

8. An photosensing apparatus comprising at least one probe electrode, a light-absorbing medium in opposition to the probe electrode, a means for adjusting the distance between the probe electrode and the light absorbing medium, a means for applying voltage between the probe electrode and the light-absorbing medium, and a means for measuring a change of electric current flowing between the probe electrode and the light absorbing medium caused by light absorption.

9. The photosensing apparatus of claim 8, wherein a means for condensing light on the light-absorbing medium is provided.

10. The photosensing apparatus of claim 8, wherein a shutter means is provided for intermittent light irradiation.

11. The photosensing apparatus of claim 8, wherein the light-absorbing medium comprises an organic dye and an electric conductor.

12. The photosensing apparatus of claim 11, wherein the organic dye is formed of a monomolecular film or a monomolecular built-up film.

13. The photosensing apparatus of claim 8, wherein the light-absorbing medium comprises an organic electric conductor and an organic semiconductor.

14. The photosensing apparatus of claim 8, wherein the light-absorbing medium comprises an inorganic electric conductor and an inorganic semiconductor.

15. The photosensing apparatus of claim 8, wherein the probe electrode is provided in plural numbers.

16. The photosensing apparatus of claim 8, wherein means for amplifying electric current detected by the probe electrode is provided.

* * * * *

UNITED STATES PATENT AND TRADEMARK OFFICE
CERTIFICATE OF CORRECTION

PATENT NO.   : 5,032,713
DATED        : July 16, 1991
INVENTOR(S)  : KEN EGUCHI, ET AL.

It is certified that error appears in the above-identified patent and that said Letters Patent is hereby corrected as shown below:

COLUMN 1

Line 52, "for" should read -- for an --.
    Line 52, "has" should read -- has a --.

COLUMN 4

Line 12, "in the" should read -- or the --.
    Line 20, "Example 2" should read -- Example 1 --.
    Line 46, "Measure" should read -- Measurement --.
    Line 59, "spectrum." should read -- spectrum --.

COLUMN 5

Line 49, "for the" should read -- for --.
    Line 60, "process" should read -- processes --.

COLUMN 6

Line 47, "An" should read -- A --.

Signed and Sealed this

Eighth Day of June, 1993

MICHAEL K. KIRK

Attest:

Attesting Officer

Acting Commissioner of Patents and Trademarks